April 17, 1956  A. G. HAGSTROM  2,741,847
MICROMETER GAUGE HAVING MEANS TO PREVENT LOST MOTION
Filed Oct. 15, 1954
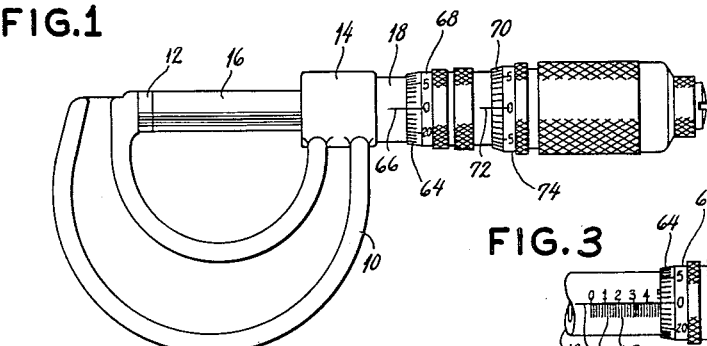
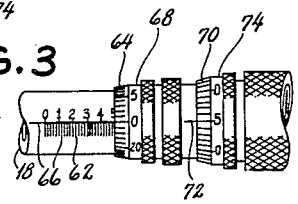
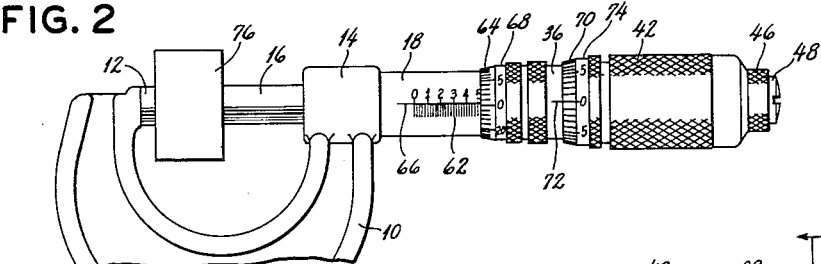
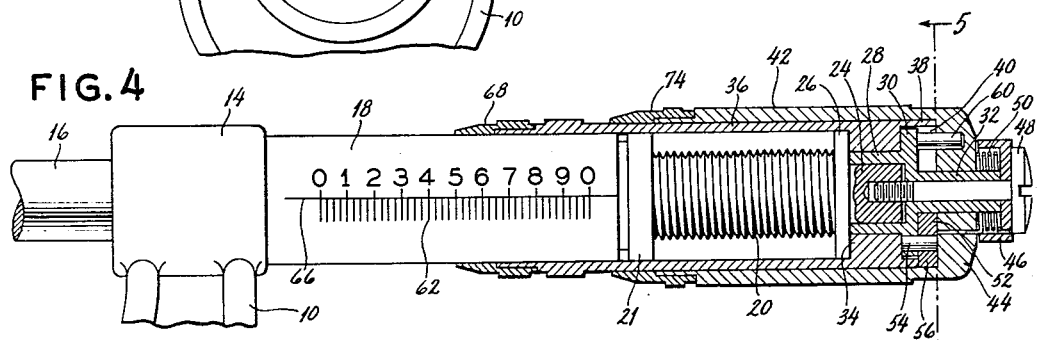
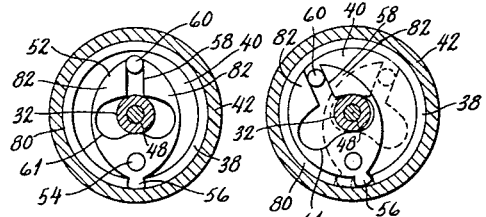
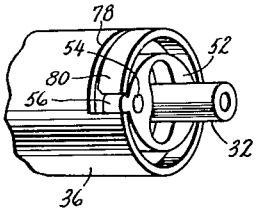
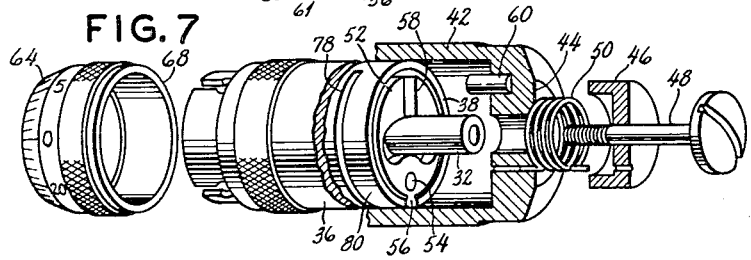
INVENTOR
ALBERT G. HAGSTROM
BY
S. Jay Teller
ATTORNEY

United States Patent Office 2,741,847
Patented Apr. 17, 1956

2,741,847

MICROMETER GAUGE HAVING MEANS TO PREVENT LOST MOTION

Albert G. Hagstrom, Newington, Conn.

Application October 15, 1954, Serial No. 462,495

2 Claims. (Cl. 33—164)

The invention relates to a micrometer gauge of the type disclosed in my Patent No. 2,267,332, dated December 23, 1941, wherein two measuring sleeves are provided and wherein a motion multiplying lever connects the two sleeves.

The general object of the invention is to provide a micrometer gauge of the type stated having means for preventing lost motion at the motion multiplying lever, either in the gauge as first manufactured or after long use and possible wear of parts.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a side view of a micrometer gauge embodying the invention.

Fig. 2 is a view similar to Fig. 1 but showing the micrometer gauge engaged with a work piece to be measured.

Fig. 3 is a fragmentary view similar to Fig. 2 but showing some of the relatively movable parts moved to measure the work piece.

Fig. 4 is an enlarged fragmentary view partly in vertical longitudinal section, the parts being in the same positions as in Fig. 3.

Fig. 5 is a transverse sectional view taken along the line 5—5 of Fig. 4.

Fig. 6 is a view similar to Fig. 5 but showing the parts in different relative positions.

Fig. 7 is a perspective view showing certain parts separated from each other and showing some of them in vertical longitudinal section.

Fig. 8 is a perspective view showing the parts to which the invention more particularly relates, the parts being turned about 90° from the positions shown in Fig. 7.

The micrometer gauge, as shown in the drawing, is generally similar to that shown in my said Patent No. 2,267,332, to which reference is made for any details not herein fully disclosed.

The gauge includes a frame 10 which may be of conventional shape, the frame having an anvil 12 at one end and an opposite support 14 which constitutes a bearing and guide for a longitudinally movable spindle 16. The support 14 has a barrel 18 through which the spindle 16 extends, and as shown in Fig. 4 said spindle has a threaded portion 20 fitting the threaded interior of an adjusting member 21 threaded into the barrel 18.

A tip 24 is formed at the outer end of the spindle 16, a flange 26 being provided on the spindle at the base of the tip, the latter extending into a recess formed in the inner side of a flanged sub-spindle 28. The sub-spindle is rigidly connected with the spindle for rotation in unison therewith and it has a flange 30. A tubular neck 32 extends outwardly from said sub-spindle. An annular recess is formed between the flange 26 of the spindle and the flange 30 of the sub-spindle, and an integrally formed annular rib 34 on a first measuring sleeve 36 is located in said recess. The sleeve 36 surrounds and closely fits the barrel 18 and it is rotatable relatively to both the barrel and the spindle, but by reason of the engagement of the rib 34 with the flanges 26 and 30 the sleeve moves longitudinally in exact uniformity with the spindle. For convenience of description the sleeve 36 is designated as the "coarser" measuring sleeve. The sleeve 36 has a flange 38 which extends longitudinally outwardly and surrounds the flange 30. The flange 38 extends beyond the flange 30 and it preferably provides a substantially complete cylindrical recess 40 at the outer side of the flange 30. The spindle 16 and the sub-spindle 28 are sometimes referred to collectively as constituting the "spindle."

A second measuring sleeve 42 is provided which surrounds and closely fits the sleeve 36 and which has an outer end wall 44 apertured to receive and fit the neck 32 on the sub-spindle 28. The sleeve 42 is held in place by a cap 46 and by a headed screw 48 which extends through an aperture in the cap and through the hollow neck 32 and into the tip 24 of the spindle. When the screw 48 is tightened the cap 46 and the sub-spindle 28 and the spindle 16 are all rigidly connected with each other, and the sleeve 42 is held against relative longitudinal movement although it is rotatable relatively to the sleeve 36 and relatively to the spindle 16 and the cap 46. For convenience of description the sleeve 42 is designated as the "finer" measuring sleeve.

A return spring 50 is provided which acts as a resilient connection between the said sleeve 42 and the cap 46. As shown, the spring 50 is a coil spring which surrounds the neck 32, one end of the spring being bent to enter a hole in the cap 46 and the opposite end of the spring being bent to enter a hole in the end wall 44 of the sleeve 42. Inasmuch as the cap is rigidly connected with the spindle, the spring 50 serves as above stated to resiliently connect the sleeve 42 and the spindle. The spring biases the sleeve 42 for movement in the counterclockwise direction as viewed in Fig. 7. The rotative force exerted by the spring 50 may be adjusted by loosening the screw 48 and turning the cap 46 until the required adjustment is reached.

A motion multiplying lever 52 is provided for transmitting motion from the second or finer measuring sleeve 42 to the first or coarser measuring sleeve 36. The lever 52 is pivotally mounted on the flange 30 of the sub-spindle by means of a pin 54, as shown in Figs. 4, 5 and 7, this lever being within the recess 40. The flange 38 has a notch which receives a finger 56 projecting from the lever 52. The lever 52 has a lengthwise slot 58 which receives a pin 60 projecting from the inner face of the end wall 44 of the second measuring sleeve 42. The lever 52 has an arcuate slot 61 through which the neck 32 extends, the last said slot permitting the lever to move to the extent indicated in Fig. 6.

The barrel 18 is provided with a scale 62 having graduations which are numbered from one to ten and these are sub-divided into four spaces each of which denotes twenty-five thousandth of an inch. The coarser measuring sleeve 36 has a graduated scale 64 extending around it and divided into twenty-five spaces, each representing one twenty-fifth of the distance around the sleeve. The scale 62 has an index mark 66, and a turn of the sleeve 36 from zero to the first graduation mark thereon represents one one-thousandth (.001) of an inch, that is, the end of the spindle will be moved from the anvil the distance of one one-thousandth (.001) of an inch and a full turn of the sleeve represents twenty-five one-thousandths (.025) of an inch, moving the sleeve along the scale 62 a distance of one graduation thereof and denoting a movement of the end of the spindle from the anvil a distance of twenty-five one-thousandths (.025) of an inch.

Preferably the scale 64 is not provided directly on the sleeve 36 but is provided on a band 68 which is adjustably rotatable on the sleeve and which is frictionally held in any position to which it may be moved.

The finer measuring sleeve 52 has a graduated scale 70 which cooperates with an index mark 72 on the sleeve 36. The scale is so graduated that rotation thereof by one graduation represents a movement of the spindle through a distance of one ten-thousandth (.0001) of an inch. The scale 70 preferably has four similar sections each with its own zero mark, and the sleeve 36 has four equally spaced index marks 72, only one of which is shown. Preferably the scale 70 is not provided directly on the sleeve 42 but is provided on a band 74 which is similar to the band 68, the band 74 being rotatable on the sleeve 42 and being frictionally held in any position to which it may be moved.

The spring 50 is sufficiently strong to normally hold the sleeve 42 in the position shown by full lines in Fig. 6, the motion multiplying lever 52 being in engagement with the inner face of the flange 38 on the coarser measuring sleeve 36. The spring serves to retain the parts in the last said relationship whenever force is applied to turn the sleeve 42 clockwise, so long as no resistance is offered to lengthwise movement of the spindle 16. The least resistance, however, to such movement of the spindle will cause the spring 50 to yield and permit rotation of the sleeve 42 in the clockwise direction at a rate faster than that of the rotation of the sleeve 36.

In the operation of the micrometer gauge, the spindle is preliminarily positioned to provide sufficient space between it and the anvil 12 for the reception of a part to be measured, such as the work piece 76 shown in Fig. 2. Then force is initially applied to turn the sleeve 42 clockwise and, as has been explained, the construction is such that all the parts, with the exception of the frame 10 and the barrel 18, will rotate in unison and at the same rate. The spring 50 holds the lever 52 in the relative position shown by full lines in Fig. 6. It will be understood that during such rotation the zero mark of the scale 70 registers with the index mark 72 on the sleeve 36, as shown in Figs. 1 and 2. The instant, however, that the spindle 16 encounters resistance, as by engagement with said work piece 76, as shown in Fig. 2, the sleeve 42 will begin to turn faster than the sleeve 36 and at a rate ten times faster. This is effected by a yielding of the spring 50, which, up to this time, has held the sleeve 42 and the motion multiplying lever 52 in the relative positions shown by full lines in Fig. 6. This yielding of the spring causes the force applied to the sleeve 42 to exert its influence on the multiplying lever through the medium of the pin 60. The ratio of distance between the pivot 54 and the connection between the finger 56 and the flange 38 on the sleeve 36 and the distance between the said pivot 54 and the connection of the pin 60 to the lever is such as to effect an increased ten-fold turning movement of the sleeve 42 over the sleeve 36. During this operation the motion multiplying lever 52 moves to the right from the position shown by full lines in Fig. 6 toward the position shown in Fig. 5 and beyond such position, should circumstances so require, until the multiplying lever makes contact with the opposite side of the flange 38 as shown by dotted lines in Fig. 6.

As an example of the operation, and referring particularly to Fig. 2, the parts are shown in the positions which they occupy at the instant when the spindle 16 first touches the work piece 76 by clockwise turning movement of the sleeve 42, all of the parts up to this point turning in unison at the same rate and the measurement, as denoted by the instrument, now having been effected. It is now to be determined what this measurement is.

The sleeve 36 having been rotated clockwise, together with the sleeve 42 to which the force was applied, it is seen that the zero mark on the sleeve 36 has not quite reached the index mark 66. It is consequently evident that the five-hundred-thousandth (.500) mark has not been reached and that the measurement is something over five-hundred-thousandths (.500), that is, it is .500 plus.

When the Fig. 2 position is reached, the work piece resists or prevents continued rotation of the spindle, and continued rotation of the sleeve 42 causes the spring 50 to yield with resultant movement of the motion multiplying lever 52 to the right from the position shown by full lines in Fig. 6. This effects movement of the sleeve 36 in the same direction but at a rate one-tenth as fast as that of the sleeve 42. Rotation of the sleeve 42 is continued until the zero mark on the sleeve 36 registers with the index mark 66 on the barrel 18, as shown in Fig. 3. From the point just mentioned at which the spindle first contacted with the work piece and the sleeve 42 commenced to move ten times faster than the sleeve 36 it is seen by reference to Fig. 3 that the sleeve 42 has moved a distance of five graduation marks from the zero registration shown in Fig. 2. In other words, the sleeve 42 has moved to an extent representing five-ten-thousandths of an inch and consequently the reading of the measurement of the thickness of the work piece is .5005 of an inch.

Fig. 1 shows the scales 64 and 70 in the positions corresponding to a zero distance between the anvil and spindle. With the spindle engaging the anvil as shown, the bands 68 and 74 are rotatively adjusted if necessary so as to provide the required zero reading.

It will be noted that the measurements obtained by the gauge are positive and that any measurements obtained may be read directly by simply noting the position of the two sleeves 36 and 42 with respect to the graduations thereon. Inasmuch as the spindle 16 is rotated only through the action of the spring 50, the pressure applied to the work pieces is always the same with resultant accuracy of measurement. This pressure and the accuracy are not in any way dependent upon any personal touch of the user.

When the measurement of a work piece has been completed, the sleeves are rotated in the opposite or counter-clockwise direction and the spring 50 immediately restores the parts to the relationship shown in Fig. 2 and by full lines in Fig. 6. The micrometer gauge is then ready for a subsequent measuring operation.

The micrometer gauge as thus far described is substantially identical with that disclosed in my said Patent No. 2,267,332, and the improvements to which the present invention more particularly relates will now be described.

A micrometer gauge embodying the invention is a high precision device, and it is therefore very important to avoid any lost motion in the action of the motion multiplying lever 52. Such lost motion should also be avoided not only in the gauge as initially made but also in the gauge after long use and after possible wear of parts. In the absence of special provision there might be lost motion, initially or subsequently, at the finger 56 or at the pin 60.

In order to avoid any lost motion at the finger 56, the flange 38 is provided with a circularly extending slot 78 which terminates at the notch for the said finger. The slot 78 frees a circularly extending portion or strip 80 of the flange 38, the said flange strip 80 being resilient and extending to the said notch and the said strip being initially curved slightly inwardly from the main body of the said flange. The width of the notch for the finger 56 is initially made slightly less than the width of the finger and during assembly the finger is forced into the notch to force the strip 80 slightly outwardly. Thus the resilient strip 80 always presses against the finger 56, even after wear, and it always prevents any lost motion between the flange 38 and the finger 56 of the lever 52.

In order to avoid lost motion at the pin 60, the lever 52 is provided with similar resilient bifurcations 82, 82, these bifurcations being provided by extending the slot 58 to the arcuate slot 61. The width of the slot 58 is initially made slightly less than the diameter of the pin 60 and during assembly the pin is forced into the slot to slightly spread the said bifurcations 82, 82. Thus the resilient bifurcations always press against the pin, even after wear, and they always prevent any lost motion between the lever and the pin.

The invention claimed is:

1. In a micrometer gauge having a rotatable spindle and having first and second concentric sleeves partly surrounding the spindle and rotatable relatively thereto which second sleeve partly surrounds the first sleeve and has an outer end wall, a flange on the outer end of the first sleeve and provided with a notch and with a yieldable resilient portion at one edge of said notch, a transversely extending lever pivoted near one end to the spindle for movement about a longitudinal axis and serving to transmit rotation to a limited extent from the second sleeve to the first sleeve with the second sleeve rotating at a greater rate, said lever including a finger at the last said end thereof entered in the notch in said flange and having a width slightly greater than the initial width of the notch so that the resilient flange portion always applies pressure to the finger to prevent lost motion at the finger during pivotal movement of the lever and during relative rotation of the sleeves and said lever also including resilient bifurcations which define a lengthwise slot therein near the opposite end thereof, and a longitudinal pin on the end wall of the second sleeve entered in the slot in the lever and having a diameter slightly greater than the initial width of the slot so that the said resilient bifurcations always apply pressure to the pin to prevent lost motion at the pin during pivotal movement of the lever and during relative rotation of the sleeves.

2. In a micrometer gauge having a rotatable spindle and having first and second concentric sleeves partly surrounding the spindle and rotatable relatively thereto which second sleeve partly surrounds the first sleeve and has an outer end wall, a flange on the outer end of the first sleeve and provided with a notch and with a yieldable resilient portion at one edge of said notch, a transversely extending lever pivoted near one end to the spindle for movement about a longitudinal axis and serving to transmit rotation to a limited extent from the second sleeve to the first sleeve with the second sleeve rotating at a greater rate, said lever including a finger at the last said end thereof entered in the notch in said flange and having a width slightly greater than the initial width of the notch so that the resilient flange portion always applies pressure to the finger to prevent lost motion at the finger during pivotal movement of the lever and during relative rotation of the sleeves and said lever having a lengthwise slot therein near the opposite end thereof, and a longitudinal pin on the end wall of the second sleeve entered in the slot in the lever and cooperating with said lever to control the relative rotation of the sleeves.

References Cited in the file of this patent

UNITED STATES PATENTS

| 1,108,697 | Cash | Aug. 25, 1914 |
| 1,357,323 | Jacques | Nov. 2, 1920 |
| 2,267,332 | Hagstrom | Dec. 23, 1941 |